Figure 1:
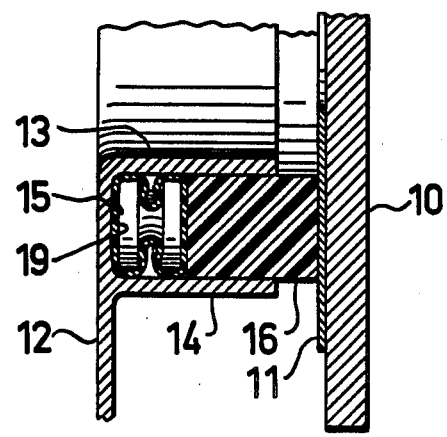

United States Patent [19]

Merilä

[11] 4,394,021
[45] Jul. 19, 1983

[54] CONTACT SEALING

[75] Inventor: Jouni A. Merilä, Pajala, Sweden

[73] Assignee: Luossavaara-Kiirunavaara AB, Stockholm, Sweden

[21] Appl. No.: 235,858

[22] Filed: Feb. 19, 1981

[30] Foreign Application Priority Data

Feb. 25, 1980 [SE] Sweden ............................... 8001455

[51] Int. Cl.³ .............................................. F16J 15/46
[52] U.S. Cl. .................................... 277/34.3; 277/154
[58] Field of Search .......................... 277/34, 34.3, 154

[56] References Cited

U.S. PATENT DOCUMENTS

| 2,846,281 | 8/1958 | Szigeti | 277/154 |
| 3,262,707 | 7/1966 | Williams | 277/34.3 |
| 3,337,222 | 8/1967 | Smith et al. | 277/34.3 |
| 3,628,798 | 12/1971 | Mehlhope | 277/34 |
| 3,717,352 | 2/1973 | Jansing et al. | 277/34.3 |
| 3,722,895 | 3/1973 | Mevissen | 277/34.3 |
| 3,737,139 | 6/1973 | Watts | 277/34.3 |
| 4,227,702 | 10/1980 | Thate | 277/34.3 |

Primary Examiner—Robert I. Smith
Attorney, Agent, or Firm—Cushman, Darby & Cushman

[57] ABSTRACT

A contact sealing for adaptive abutment to a rotating sealing surface is provided with an annular groove, in which a pressurized hose is located which abuts a sealing member and presses the same against the sealing surface.

1 Claim, 4 Drawing Figures

CONTACT SEALING

This invention relates to a contact sealing, which is particularly adapted for use when a material flow through a wall opening and a rotating drum is to be sealed gas-tight to the ambient.

At the manufacture of iron ore, concentrate is supplied in a pelletizing plant through the stationary outer wall of a so-called grate into a rotating drum, so-called kiln, in which crude balls are sintered at about 1200° C. and where vacuum prevails. In order to obtain good heat economy and not to disturb the process in general, the ambient air must not be permitted to penetrate inward between the drum and the outer wall.

The drum is subjected to substantial thermal deformation by temperature variations—the play between the drum and the outer wall normally varies about 20 mm between start and operation—and by non-uniform temperature distribution across the shell surface. The drum further is subjected to mechanic deformation from deflection and vibrations. This understandably involves the problem of satisfactorily sealing the connection between the drum and the outer wall.

It is known that for this purpose an axial sealing with two rigid steel rings abutting each other is provided, of which rings the ring of the outer wall is exposed to a force directed to the sealing surface. Due to the fact, that the ring of the drum unavoidably participates in the aforesaid deformation, gaps are formed, through which air penetrates into the drum.

The present invention has the object to propose an adaptive contact sealing with good contact capacity, low friction and simple design.

This object is achieved in that the sealing has been given the characterizing features defined in the attached claims.

In its simplest embodiment, the sealing consists of a hose located in a bottoming annular groove and having an inner overpressure pressing the hose shell against the groove opening, at which the shell abuts the rear side of a flexible sealing member, the front side of which is the sealing surface. Further features are apparent from the claims.

Figure 2:
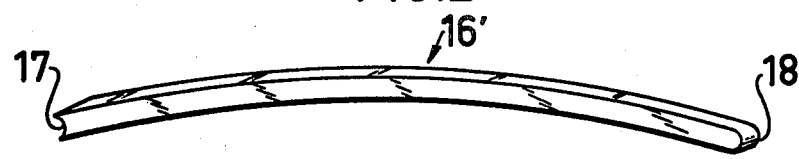
Figure 3:
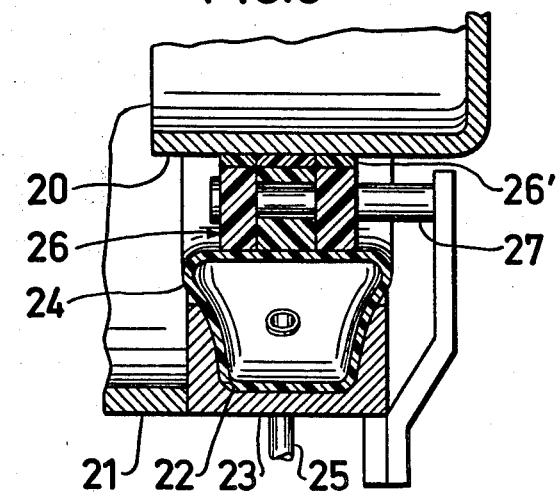
Figure 4:
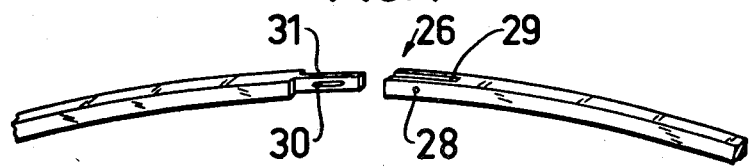

The invention is explained in greater detail in the following, with reference to the accompanying drawing, in which FIG. 1 is a portion of a section through an axial sealing, FIG. 2 shows on a smaller scale a portion of a sealing member according to FIG. 1, FIG. 3 is a section through a portion of a radial sealing, and FIG. 4 shows on a smaller scale a portion of a sealing member according to FIG. 3.

The rotary drum (not shown) according to FIG. 1 is provided with a radial outer flange 10, to which a coaxial circular ring disc 11 of steel is attached, the outer surface of which forms a sealing surface and is polished to suitable surface finish. From the stationary wall 12 two coaxial ring flanges 13,14 extend and together form a U-shaped annular groove 15 open to the ring disc 11. Into said annular groove 15 a plurality (for example 18) of arched rods 16', for example of graphite, as shown in FIG. 2, are inserted which together form a sealing member 16 abutting the ring disc 11.

Each rod 16' is provided at the outer ends with an axial recess 17 and a complementary chamfering 18 for receiving adjacent rods 16'. Owing to this division into several sections, which are axially movable relative to each other and can be actuated individually, the sealing member 16 can be caused to participate in possible deviations of the ring disc 11 with respect to flatness, inclination and distance to the wall 12.

For this purpose, a flexible and/or elastic hose 19, for example a fire hose, is placed in the annular groove 15 to abut the sealing member surface remote from the sealing surface, which hose has an originally folded cross-section so that the hose can be widened as the wear of the sealing member increases. The hose is subjected to pressure by a preferably compressible fluid, so that the contact pressure is distributed uniformly over the circumference of the sealing member 16, irrespective of the aforesaid deviations. The sealing embodiment described above also can be arranged as a radial sealing.

FIG. 3 shows a modified embodiment of a radial sealing according to the invention. In this case the sealing surface of the rotary drum is formed by the outside of an axial ring flange 20. The annular groove 22, which in this case is radial, consists of the inside of a circularly bent UNP-beam 23, which in a suitable manner is attached at 21 to the outer wall (not shown). As in FIG. 1, a hose 24 with inner overpressure and with a connection 25 to, for example, a compressed air source is located in the annular groove 22. Said compressed air source also can be provided with means for maintaining the pressure constant independently of the volume. The pressurized hose 24 is supported by three inner surfaces of the annular groove 22 and presses a sealing member 26 against the sealing surface of the annular flange 20.

The sealing member 26, see also FIG. 4, consists of a flexible strip, the sealing surface of which is provided with a layer of TEFLON. The strip in its entirety may consist of a suitable low-friction material.

The ends of the strip are jointed by groove and tongue connection according to FIG. 4, so that the sealing effect is maintained perpendicularly to the joint. The strip is retained in tangential and axial direction between the ring flange 20 and hose 24 by an axial stud 27, which is rigidly connected to the aforesaid outer wall. The stud 27 extends through circular holes 28 perpendicularly to the groove 29, and the tongue 31 receives the stud in a tangential slit 30, so that the strip ends can move through a limited distance relative to each other in axial direction, whereby the strip can participate with good abutment in the radial deviations of the rotating ring flange 20.

The invention is not restricted to rotary drums in pelletizing plants, but can advantageously be utilized in many applications where great play variations between two parts movable relative to each other occur.

What I claim is:

1. A contact sealing for sealing an annular space between two relatively rotating members, particularly for sealing a material flow to a rotary drum from an opening in a stationary wall, one of the members being provided with an annular sealing surface and the other member being provided with an annular bottoming groove facing the sealing surface of said one member, the bottoming groove receiving a closed pressurized flexible and expandable annular hose and an annular sealing member, said sealing member being force-engaged by said hose to seal about said sealing surface, said sealing member being a flexible strip, having two ends respectively being provided with a groove and a tongue, the groove and tongue being interconnected and secured by an axial stud, and the stud in turn being secured to said other member.

* * * * *